United States Patent
Suzuki (10) Patent No.: US 9,189,350 B2
(45) Date of Patent: Nov. 17, 2015

(54) DISK ARRAY CONTROL APPARATUS, DISK ARRAY APPARATUS, AND DISK ARRAY CONTROL METHOD

(71) Applicant: NEC Corporation, Minato-ku, Tokyo (JP)

(72) Inventor: Akio Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 13/733,237

(22) Filed: Jan. 3, 2013

(65) Prior Publication Data

US 2013/0179725 A1    Jul. 11, 2013

(30) Foreign Application Priority Data

Jan. 6, 2012    (JP) ................... 2012-001406

(51) Int. Cl.
  *G06F 11/00* (2006.01)
  *G06F 11/20* (2006.01)
  *G06F 11/10* (2006.01)
  *G06F 11/07* (2006.01)

(52) U.S. Cl.
  CPC ........ *G06F 11/2087* (2013.01); *G06F 11/0793* (2013.01); *G06F 11/1076* (2013.01); *G06F 11/1092* (2013.01); *G06F 2211/1009* (2013.01)

(58) Field of Classification Search
  CPC ............ G06F 11/1076; G06F 11/1092; G06F 11/0793; G06F 3/0689
  See application file for complete search history.

(56) References Cited

U.S. PATENT DOCUMENTS

| 7,356,730 | B2* | 4/2008 | Ulrich et al. ............. 714/6.12 |
| 7,627,779 | B2* | 12/2009 | Fair ................. 714/11 |
| 7,904,749 | B2* | 3/2011 | Kawaguchi ............. 714/6.1 |
| 8,201,018 | B2* | 6/2012 | Navarro et al. ............. 714/6.22 |
| 8,234,519 | B2* | 7/2012 | Kawaguchi ............. 714/6.1 |
| 2009/0327801 | A1 | 12/2009 | Maeda et al. |

FOREIGN PATENT DOCUMENTS

| JP | 10-260790 A | 9/1998 |
| JP | 2000-66845 A | 3/2000 |
| JP | 2006-277042 A | 10/2006 |
| JP | 2009-238094 A | 10/2009 |
| JP | 2010-15195 A | 1/2010 |
| JP | 2010009442 A | 1/2010 |

OTHER PUBLICATIONS

Japanese Office Action for JP Application No. 2012-001406 mailed on Apr. 23, 2013 with English Translation.
Japanese Office Action for JP Application No. 2012-001406 mailed on Jul. 9, 2013 with English Translation.

* cited by examiner

*Primary Examiner* — Charles Ehne (57) ABSTRACT

To provide a disk array control apparatus which enables security of data from a host controller along with prevention of the degradation of process performance during rebuild processing.
The disk array control apparatus includes a host interface unit which receives write data from a host controller; a rebuild control unit which controls rebuild processing for creating recovery data writes the created recovery data into a disk medium; and a disk control unit which writes the write data which is received from the host interface unit into the disk medium and writes at least a part of the recovery data which is created based on the control of said rebuild control unit into a write cache.

9 Claims, 5 Drawing Sheets

DISK ARRAY CONTROL APPARATUS, DISK ARRAY APPARATUS, AND DISK ARRAY CONTROL METHOD

INCORPORATION BY REFERENCE

This application is based upon and claims the benefit of priority from Japanese Patent Application No. 2012-001406, filed on Jan. 6, 2012, the disclosure of which is incorporated herein in its entirety by reference.

TECHNICAL FIELD

The present invention relates to disk array control and, particularly to a data recovery.

BACKGROUND ART

An information processing system which consists of computers and networks needs to handle many kinds of capacities per a unit of data (for example, a capacity of a file) from large size to small size as data of process. But the physical capacities of disk apparatuses (disk drives) which store the data are fixed. Consequently, if each of the disk apparatus is stored and managed, useless areas occur in each of the disk apparatuses.

And, the total amount of data handled in an information processing system has been increasing year by year. Consequently, if a large number of disk apparatuses are managed per each disk apparatus, the useless areas increase.

And, for a host controller such as a computer which uses disk apparatuses, the number of disk apparatuses targeted for management becomes enormous. Consequently, for the host controller, the management of disk apparatuses becomes complex and the process for management increases.

Therefore, a disk array apparatus is used as a storage device having a large storage capacity, which is free from a capacity of the disk apparatus (For example, refer to Japanese Patent Laid-Open No. 2010-009442 (patent document 1)).

The disk array apparatus includes a plurality of disk apparatuses. Then, this disk array apparatus reads and writes data as logical disk apparatuses to a host controller. The host controller can use the logical disk apparatuses which has necessary capacities and numbers for management by using the disk array apparatus.

The disk array apparatus includes a plurality of disk apparatus which store and play data and a disk array control apparatus (a disk array controller) which executes the exchange of data with the host controller and the control of the disk apparatuses.

Moreover, in order to secure the reliability of data, the disk array apparatus described in the patent document 1 uses RAID (Redundant Arrays of Inexpensive Disks or Redundant Arrays of Independent Disks) which has data redundancy. In order to realize the RAID, the disk array control apparatus manages the disk apparatuses regarding the management of the configuration of the RAID, and the like. And, the disk array control apparatus creates the data for securing the redundancy, and manages the record and the play of data for securing redundancy.

In order to secure the redundancy of data, the disk array apparatus using the RAID, which is described in the patent document 1 constructs the RAID with a plurality of disk apparatuses. Further, hereinafter, a state in which all the disk apparatus constituting the RAID are normally operating will be referred to as 'a normal state'. Since the redundancy of data based on the RAID can be secured, the normal state will be sometimes referred to as 'a state of redundancy'.

Even if one or more of the disk apparatuses included in the RAID are unusable (for example, failure), the disk array apparatus using the RAID can read and write data. However, in order to replace a disk apparatus having become unusable with a usable disk apparatus, the disk array apparatus separates the unusable disk apparatus from the array configuration logically or physically (electrically). Such state as described above, in which an unusable disk apparatus is included in the RAID configuration or is separated from the RAID configuration, will be referred to as 'a reduced state'. And, since the redundancy of data cannot be secured, the reduced state will be sometimes referred to as 'a state of non-redundancy'.

The separated disk apparatus is removed through a predetermined replacement operation and a normal disk apparatus is installed into the disk array apparatus. After the replacement of the faulty disk apparatus, the disk array control apparatus recovers (rebuilds) data of the currently-installed disk apparatus based on the data of disk apparatuses which have been operating in a reduced state. When whole data of the currently-installed disk apparatus has been recovered, the disk array apparatus returns to a normal state, in other words, a state of redundancy.

In this rebuild processing, the disk array control apparatus reads out a predetermined unit of data from the disk apparatuses which have been operating in the reduced state; calculates data which is necessary for the security of redundancy of data on the basis of the read-out predetermined unit of data; and writes the calculated data into the currently-installed disk apparatus after replacements. The disk array control apparatus repeats these operations to recover all data to be stored in the currently-installed disk apparatus after replacement.

However, even if during the rebuild processing described above, the disk array apparatus needs to process commands for reading and writing of data from the host controller. That is, the disk array apparatus in the rebuild processing state processes both read/write operations for rebuilding and read/write operations for data from the host controller. Consequently, the disk array apparatus in the rebuild processing state degrades the performance of processing such as responding to a process from the host controller by the time of the rebuild processing.

The storage capacities of recent disk apparatuses have been particularly increasing significantly. Consequently, a period of necessary time of rebuilding for recovering data of a currently-installed disk apparatus after replacement increases. That is, the influence of the rebuild processing leading to the degradation of process performance increases.

Among disk apparatuses, there exist disk apparatuses provided with caches to improve the process performance.

Therefore, in data writing processes, the disk array apparatus described in the patent document 1 does not write data into a disk medium, but writes it into a write cache, and can improve the process performance thereby.

More specifically describing, the disk array apparatus described in the patent document 1 notifies the host controller of the completion of a data writing process at the time when the disk array apparatus has written write data received from the host apparatus into the write cache of the disk apparatus.

The host controller determines that the data writing process has been completed upon reception of the notification of the completion from the disk array apparatus, and performs a next process (for example, a process of clearing write data or a process of issuing a next command).

Further, the disk apparatus, which writes the write data in the write cache, writes the write data which is written in the write cache into the disk medium at a predetermined timing (for example, at a timing when there is no access from the host controller during a constant period of time) or in accordance with an instruction from the host controller.

SUMMARY

An exemplary object of the present invention is to provide a disk array control apparatus for a disk array apparatus, a disk array control apparatus and a disk array control method which enable security of data from a host controller along with prevention of the degradation of process performance during rebuild processing.

A disk array control apparatus according to an exemplary aspect of the invention includes a host interface unit which receives write data from a host controller; a rebuild control unit which controls rebuild processing for creating recovery data and writes the created recovery data into a disk medium; and a disk control unit which writes the write data which is received from said host interface unit into the disk medium and writes at least a part of the recovery data which is created based on the control of said rebuild control unit into a write cache.

A disk array apparatus according to an exemplary aspect of the invention includes a plurality of disk apparatuses including a disk media which stores data, and a write cache which temporarily stores the data which is stored into the disk media, and a disk control apparatus including a host interface unit which receives write data from a host controller; a rebuild control unit which controls rebuild processing for creating recovery data and writing the created recovery data into the disk media; and a disk control unit which writes the write data which is received from said host interface unit into the disk media, writes at least a part of the recovery data which is created based on the control of said rebuild control unit into the write cache.

A disk array control method according to an exemplary aspect of the invention includes receiving write data from a host controller; writing the write data from the host interface unit into a disk medium; creating recovery data; writing at least a part of the created recovery data into a write cache.

A computer readable medium embodying a program to an exemplary aspect of the invention, said program causing a disk array control apparatus to perform a method, said method including receiving write data from a host controller; writing the write data from the host interface unit into a disk medium; creating recovery data; and writing at least a part of the created recovery data into a write cache.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment according to the present invention will be described with reference to the drawings.

First Exemplary Embodiment

Figure 1:
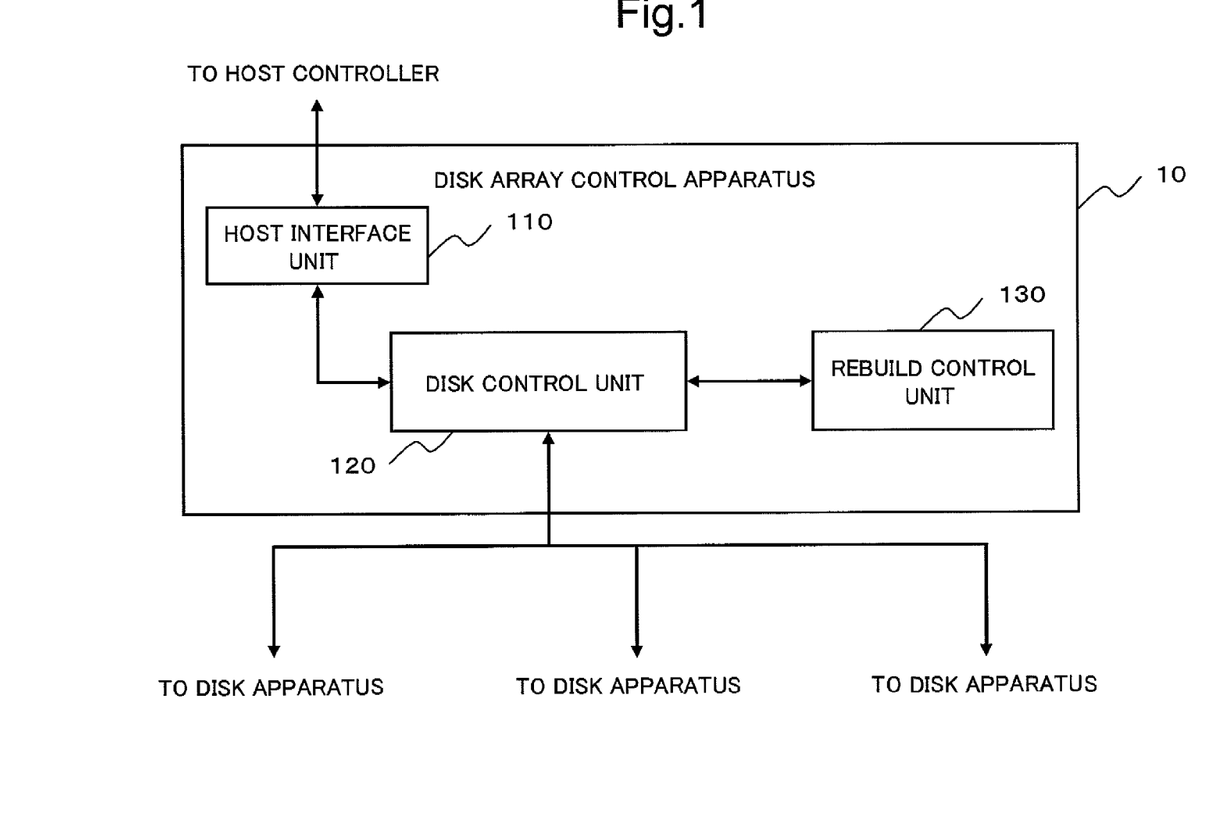
FIG. 1 is a block diagram illustrating an example of the configuration of a disk array control apparatus according to a first exemplary embodiment of the present invention.

FIG. 1 is a block diagram illustrating an example of the configuration of a disk array control apparatus 10 according to a first exemplary embodiment.

First, the configuration of the disk array control apparatus 10 will be described.

The disk array control apparatus 10 includes a host interface unit 110, a disk control unit 120 and a rebuild control unit 130.

The host interface unit 110 receives a writing command (a write command) and write data from a host controller which is not illustrated, and sends them to the disk control unit 120. And, the host interface unit 110 receives a reading command (a read command) from the host controller, sends it to the disk control unit 120, receives read-out data from the disk control unit 120, and sends it to the host controller.

The disk control unit 120 controls the writing of data into a disk apparatus which is not illustrated and the reading of data from the disk apparatuses. Moreover, the disk control unit 120 instructs the disk apparatus either the writing into a write cache or the writing into a disk medium when the writing of data into the disk apparatus.

The rebuild control unit 130 controls rebuild processing. For example, the rebuild control unit 130 instructs or commands the reading out of data for recovery, the creating of recovery data and the writing of the created recovery data by controlling the disk control unit 120 in the rebuild processing.

More specifically describing, the rebuild control unit 130 causes the disk control unit 120 to perform operations described below.

(1) Reading out data targeted for rebuilding from recovery-source disk apparatuses (i.e., disk apparatuses which have been operating in the reduced state).

(2) Creating recovery data (also referred to as write data for rebuilding) for securing redundancy of data on the basis of the read-out data.

(3) Writing the created recovery data into a currently-installed disk apparatus after replacement.

Further, an instruction which the rebuild control unit 130 sends to the disk control unit 120 in rebuild processing is an instruction in accordance with the function of the disk control unit 120.

For example, when the disk control unit 120 performs simple operations such as the writing of data into the disk apparatus or the reading out of data from the disk apparatus, the rebuild control unit 130 sequentially instructs the operations "(1) to (3)" described above to the disk control unit 120.

Meanwhile, when the disk control unit 120 can perform a series of operations for rebuilding with just one command, the rebuild control unit 130 sends the command (for example, a rebuild command) to the disk control unit 120.

Further, in the operation of writing recovery data, in order to match the write states of disk apparatuses, the disk control unit 120 may write data into the disk apparatus which have been operating in the reduced state. In this case, the data which is written into the disk apparatuses which have been operating in the reduced state is the same data which is read out from the disk apparatuses. For this reason, hereinafter, a series of operations, which include the operation of reading out data from the disk apparatuses which have been operating in the reduced state and writing the read-out data into the disk apparatuses (i.e., a write-back operation), and the operation of creating recovery data and writing the created recovery data into a currently-installed disk apparatus after replacement, will be collectively referred to as "an uncorrected write operation". And, a command for instructing the uncorrected write operation will be referred to as "an uncorrected write command". (The rebuild command described above may be this uncorrected write command.)

Next, operations of the disk array control apparatus 10 will be described.

The host interface unit 110 sends a write command and the write data to the disk control unit 120 when it receives the write command and the write data from the host controller. The disk control unit 120 instructs disk apparatuses to write the write data. However, the disk control unit 120 instructs disk apparatuses to write the write data into the disk media when it receives the write command and the write data from the host interface unit 110.

Meanwhile, the disk control unit 120 reads out data from the disk apparatuses which have been operating in the reduced mode, creates recovery data, and writes recovery data into a currently-installed disk apparatus after replacement (and the disk apparatuses which have been operating in the reduced mode) when it receives an uncorrected write command for recovery from the rebuild control unit 130. However, the disk control unit 120 instructs disk apparatuses to write into the write cache in the case of the data writing based on an instruction from the rebuild control unit 130.

In this way, the disk array control apparatus 10 writes the write data from the host controller into disk media, and writes the data for rebuilding into write cache.

The completion of the write data from the host controller is notified to the host apparatus after the storage of the write data into disk media is completed. And, at this time, the currently-installed disk apparatus after replacement has been already in a normal operation state. Therefore, the write data from the host controller is written into disk apparatuses under the state where the redundancy of data is secured. Accordingly, even if an electric malfunction occurs, the data which is notified of the completion to the host controller is secured.

Meanwhile, the write data for rebuilding is written in the write cache. Consequently, rebuild processing is completed in a short time, as compared with processing for write data from the host controller. That is, the amount of influence on performance due to the rebuild processing is decreased.

In the description so far, the disk control unit 120 determines a destination of writing, depending on the sending source of the writing data (the host interface unit 110) and the instruction source of the writing data (the rebuild control unit 130). However, this exemplary embodiment is not necessary to be limited to this determination method.

For example, the write command provided to the disk control unit 120 may have a control flag for writing into the write cache and a control flag for writing into the disk media. In this case, the host interface unit 110 sets the control flag for writing into disk media, and sends the write command to the control unit 120. The rebuild control unit 130 sets the control flag for writing into write cache, and sends the write command to the disk control unit 120.

Alternatively, the disk control unit 120 may perform a write command for writing into the write cache and a write command for writing into the disk media. In this case, the host interface unit 110 uses the write command for writing into the disk media, and the rebuild control unit 130 uses the write command for writing into the write cache disk media.

Next, rebuild operations of this exemplary embodiment will be described in more detail with reference to the drawings.

Figure 2:
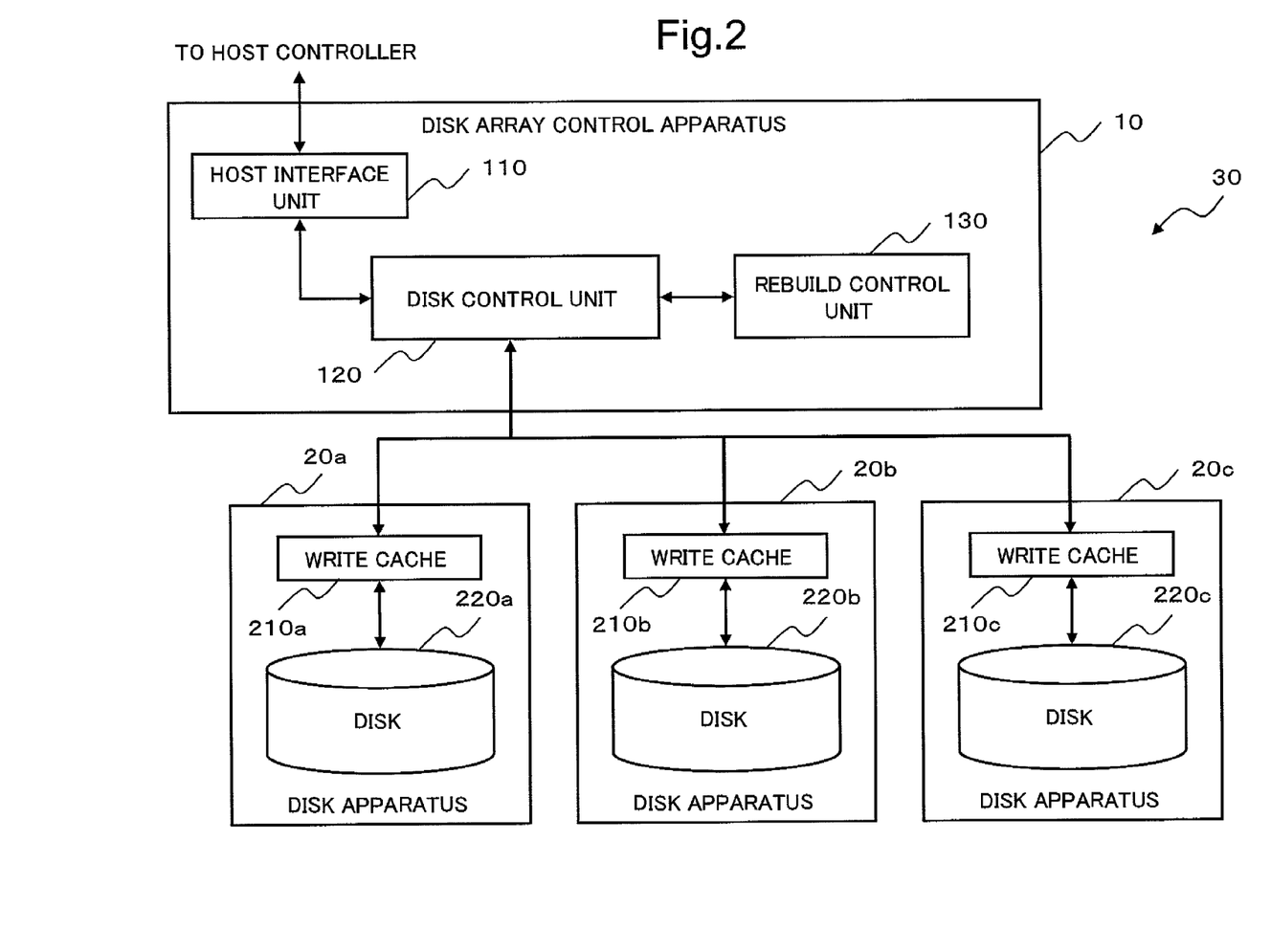
FIG. 2 is a block diagram illustrating an example of the configuration of a disk array apparatus according to a first exemplary embodiment of the present invention.

FIG. 2 is a block diagram illustrating an example the configuration of a disk array apparatus 30 including the disk array control apparatus 10, according to this exemplary embodiment. In FIG. 2, constructions identical to the constructions shown in FIG. 1 are denoted by the same reference numerals as those of the constructions shown in FIG. 1, and the detailed description thereof will be omitted.

The disk array apparatus 30 includes the disk array control apparatus 10 and disk apparatus 20a to 20c.

The disk array control apparatus 10 is identical to that shown in FIG. 1, and thus, the detailed description of the configuration thereof is omitted herein.

The disk apparatuses 20a to 20c record and play data in accordance with control performed by the disk array control apparatus 10.

The disk apparatuses 20a to 20c include write caches 210a to 210c for temporarily storing write data, and disk media 220a to 220c for storing data on a long-term basis, respectively. Further, hereinafter, the disk apparatuses 20a to 20c, the write caches 210a to 210c and the disk media 220a to 220c will be collectively referred to as a disk apparatus 20, a write cache 210 and a disk medium 220, respectively.

Further, it is just an example that, in FIG. 2, the disk apparatus 20 includes three disk apparatuses. The disk array apparatus 30 according to this exemplary embodiment may be provided with the disk apparatus 20 including less than three disk apparatuses, or more than three disk apparatuses.

The write cache 210 temporarily stores write data to be written into the disk apparatus 20. In the case of being instructed to write into the write cache 210, the disk apparatus 20 sends back the completion of the writing to the disk array control apparatus 10 at the time when the writing of data into the write cache 210 has been completed.

The disk medium 220 is a storage medium for storing data in real on a semi-permanent basis, such as a magnetic disk. In the case of being instructed to write into the disk medium 220, the disk apparatus 20 sends back the completion of the writing to the disk array control apparatus 10 at the time when the writing of all received data into the disk medium 220 has been completed. Further, in the case of being instructed to write into the disk medium 220, the disk apparatus 20 may directly write the write data into the disk medium 220. Alternatively, in order to reduce the amount of communication traffic on communication paths, the disk apparatus 20 may receive write data using the write cache 210 and write the received write data stored in the write cache 210 into the disk medium 220.

Next, operations of the disk array apparatus 30 will be described.

The disk control unit 120 of the disk array control apparatus 10 writes the write data received by the host interface unit 110 from the host controller into the disk medium 220 of the disk apparatus 20, like the disk control unit 120 shown in FIG. 1.

Meanwhile, the disk control unit 120 writes the write data for rebuild instructed by the rebuild control unit 130 into the write cache 210 of the disk apparatus 20.

Further, other operations of the disk array apparatus 30 are similar to the operations of a general disk array apparatus, and thus, the detailed description thereof is omitted herein.

Next, rebuild operations specific to this exemplary embodiment will be described further with reference to FIG. 3.

Figure 3:
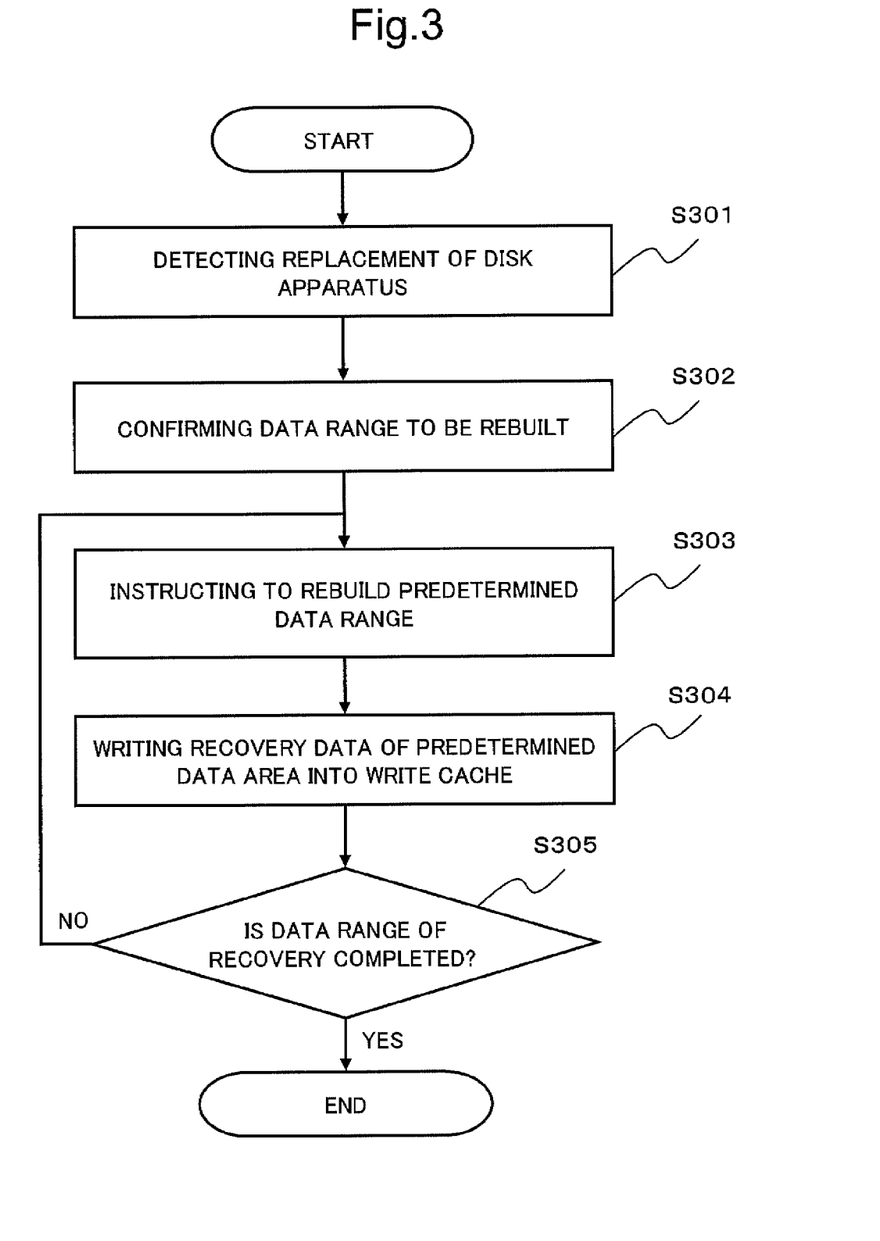
FIG. 3 is a flowchart illustrating an example of the operation of a rebuild processing according to a first exemplary embodiment of the present invention.

FIG. 3 is a flowchart which illustrates an example of the operations of the disk array apparatus 30 in the rebuild process.

In the disk array apparatus 30, a currently-installed disk apparatus after replacement may be any one of the disk apparatuses 20a to 20c, however, in this description, it is supposed that the disk apparatus 20c is the currently-installed disk apparatus after replacement. Moreover, in this description, it is supposed that the disk control unit 120 operates in accordance with a rebuild command.

Further, as described above, even during rebuild processing, the disk control unit 120 writes data of write command received from the host controller into the disk medium 220.

First, the rebuild control unit 130 starts the rebuild processing after it detects replacement of the disk apparatus 20c, (step S301). In this exemplary embodiment, a way in which the rebuild control unit 130 detects replacement of the click apparatuses is not limited to any particular way. For example, the rebuild control unit 130 may receive the notification of the replacement from a maintenance device (not illustrated) for the disk array apparatus 30 or from processing for monitoring the disk apparatus 20 performed by the disk control unit 120.

The rebuild control unit 130 confirms a data range to be recovered in rebuild processing (step S302). A way in which the rebuild control unit 130 confirms the data range to be recovered is not limited to any particular way. For example, the rebuild control unit 130 may acquire the data range to be recovered, that is, usage ranges of the disk apparatuses 20a and 20b, from the disk control unit 120. Alternatively, the rebuild control unit 130 may acquire the specification of the disk apparatus 20c via the disk control unit 120, and may perform rebuilding on the entire area of the disk apparatus 20c on the basis of the acquired specification.

The rebuild control unit 130 instructs the disk control unit 120 to recover data stored within a predetermined range starting from a head address of a non-recovery range (step S303). In step S303, as described above, the rebuild control unit 130 instructs the disk control unit 120 to perform uncorrected writing. However, the rebuild control unit 130 instructs the disk control unit 120 to perform writing into the write cache 210.

The disk control unit 120 reads out data of the instructed rebuild range from the disk apparatuses which have been operating in the reduced state; creates recovery data; and writes the created recovery data into the write cache of the currently-installed disk apparatus after replacement (step S304). Specifically, the disk control unit 120 reads out data from the disk apparatuses 20a and 20b; creates recovery data; and writes the created recovery data into the write cache 210c of the disk apparatus 20c. Further, in order to match the write states of the write cache 210, the disk control unit 120 may write data into the write cache 210a of the disk apparatus 20a and the write cache 210b of the disk apparatus 20b.

After the disk control unit 120 has completed the writing into the write cache 210, the rebuild control unit 130 judges whether the recovery of data within the entire range to be recovered has been completed, or not (step S305).

If the recovery is not completed ('NO', in step S305), the rebuild control unit 130 returns to step S302, and performs next rebuild range.

If the recovery is completed ('YES', in step S305), the rebuild control unit 130 terminates the rebuild processing.

In such a way as described above, the disk array control apparatus 10 according to this exemplary embodiment can secure data from the host controller along with preventing the degradation of performance during the rebuild process.

The reasons for this are as follows.

The disk control unit 120 of the disk array control apparatus 10 writes data received from the host interface unit 110 with a write command into the disk medium 220 of the disk apparatus 20. That is, the completion of data of the write command from the host controller is sent back to the host controller after storing into the disk medium 220. Consequently, the reliability of write data from the host controller is secured. Meanwhile, the disk control unit 120 writes the write data for rebuilding instructed by the rebuild control unit 130 into the write cache 210 of the disk apparatus 20. Consequently, the disk array control apparatus 10 can reduce the degradation of performance due to the rebuild process.

Further, the disk array control apparatus 10 according to this exemplary embodiment is not limited to the construction shown in FIG. 1. The disk array control apparatus 10 may separate such a certain one of the constructions shown in FIG. 1 into a plurality of constructions, or integrate certain plural ones of the constructions into one construction.

Figure 4:
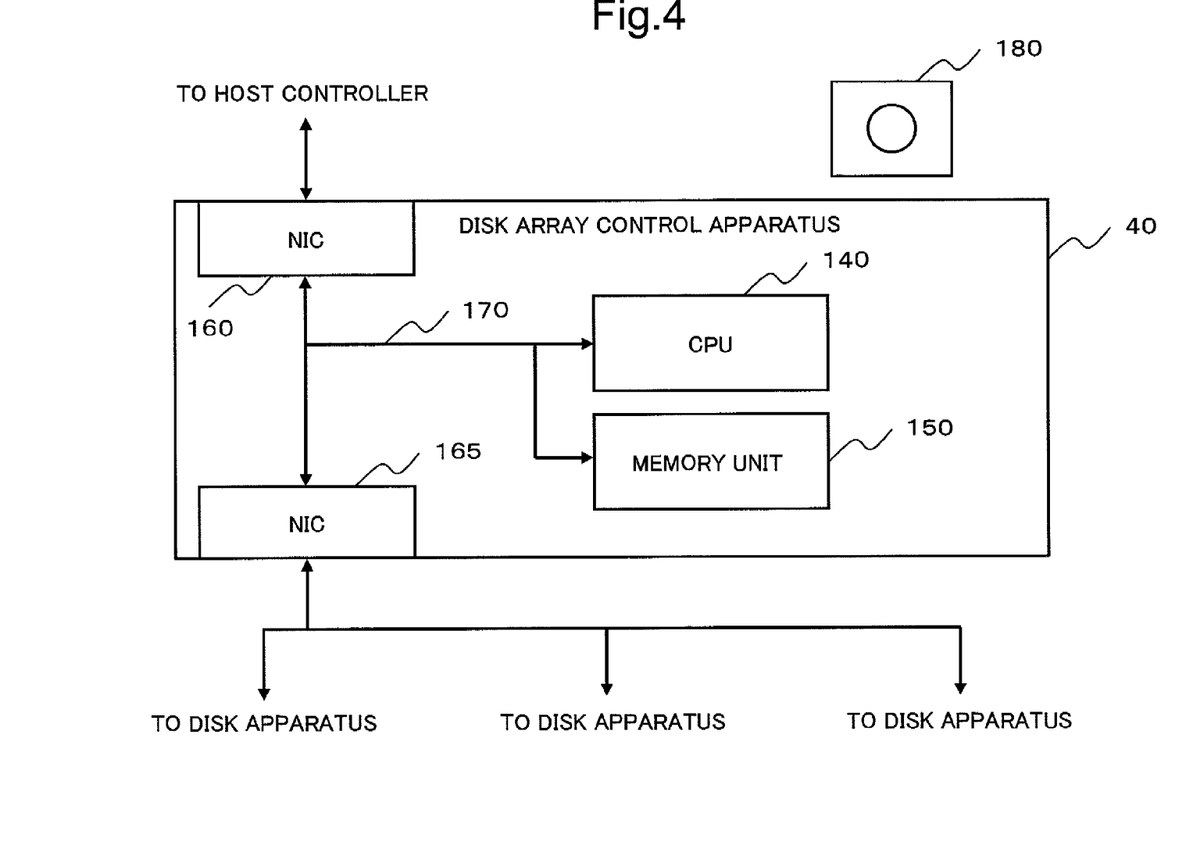
FIG. 4 is a block diagram illustrating an example of another configuration of a first exemplary embodiment according to the present invention.

FIG. 4 is a block diagram illustrating an example of a differently configured disk array control apparatus 40 according to the first exemplary embodiment.

The disk array control apparatus 40 includes a central processing unit (CPU) 140, a memory unit 150, a network interface card (NIC) 160, a network interface card (NIC) 165, and a bus 170.

The CPU 140 sends data and commands to the host controller and receives data and commands from the host controller via the NIC 160 on the basis of programs stored in the memory unit 150. And, the CPU 140 sends data to the disk apparatus 20 and receives data from the disk apparatus 20 via the NIC 165 on the basis of programs stored in the memory unit 150. Then, the CPU 140 performs the operations of the each construction of the disk array apparatus 10 shown in FIG. 1.

The memory unit 150 stores programs executed by the CPU 140 and also operates as a temporal storage of work data. The memory unit 150 may be realized by employing general storage devices, for example, such as read only memory (ROM) modules, random access memory (RAM) modules, magnetic disk devices, solid state drives (SSD), and thus, the detailed description is omitted herein.

The NIC 160 intermediates data exchange between the CPU 140 and the host controller. The NIC 165 intermediates data exchange between the CPU 140 and the disk apparatus 20. The NIC 160 and the NIC 165 may be each realized by employing an interface device or parts used for general network connection, and thus, the detailed description thereof is omitted herein.

The bus 170 is a connection bus for connecting the each construction, and is constituted by a general connection bus. Accordingly, the detailed description of the bus 170 is omitted herein.

The disk array control apparatus 40 configured in such a way as described above realizes the operations of the each construction of the disk array control apparatus 10, and thus realizes the similar effects as those of the disk array control apparatus 10.

Further, the disk array control apparatus 40 may read out programs stored in a storage medium 180, which is readable and writable from/to a computer, by using a storage medium reading-out unit (not illustrated), and may operate on the basis of the read-out programs.

Modification Example 1

The disk array control apparatus 10 according to this exemplary embodiment writes all write data for rebuilding into the write cache 210. But, the disk array control apparatus 10 according to this exemplary embodiment is not necessary to be limited to this. For example, in writing recovery data in rebuild processing, the disk array control apparatus 10 may write partial data of importance, such as data management information and so on, into the disk medium 220.

Alternatively, under the state where there is no access from the host controller, the disk control unit 120 of the disk array control apparatus 10 may write recovery data for rebuild processing into the disk medium 220. In this case, the disk control unit 120 has the function of monitoring the access state of the host interface unit 110 and discriminating the state where there has been no access from the host controller.

In modification example 1, similarly, the disk array control apparatus 10 brings out the same advantageous effects.

The reasons for this are as follows.

The ratio of the amount of the data management information relative to the entire amount of write data for rebuilding is small. Accordingly, even if the data management information is stored into the disk medium 220, the amount of the resultant influence leading to the degradation of process performance is small.

Moreover, under the state where there is no access from the host controller, a processing time for writing recovery data for rebuild processing into the disk medium 220 does not affect to any access of the host controller.

Modification Example 2

In the disk array control apparatus 10 according to this exemplary embodiment, the host interface unit 110 and the rebuild control unit 130 control the writing into the disk apparatus 20. Alternatively, in the disk array control apparatus 10, the disk control unit 120 controls the writing into the disk apparatus 20. However, in the disk array control apparatus 10 according to this exemplary embodiment, a different construction may control the writing into the disk apparatus 20.

Figure 5:
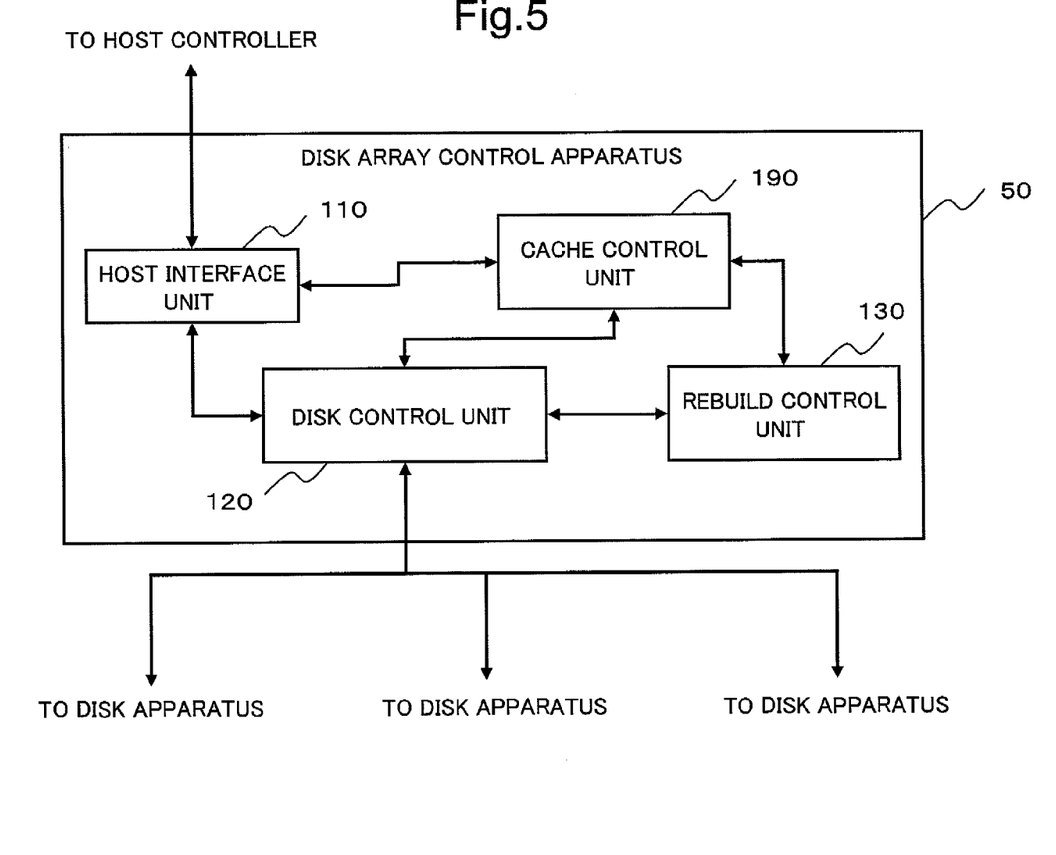
FIG. 5 is a block diagram illustrating an example of the configuration of a second modification example of a first exemplary embodiment according to the present invention.

FIG. 5 is a block diagram illustrating an example of the configuration of modification example 2.

In FIG. 5, constructions identical to the constructions shown in FIG. 1 are denoted by the same reference numerals as those of the constructions shown in FIG. 1, and the detailed description thereof is omitted herein.

A disk array control apparatus 50 includes the host interface unit 110, the disk control unit 120, the rebuild control unit 130 and a cache control unit 190.

The cache control unit 190 of the disk array control apparatus 50 sends an instruction which instructs the writing into the write cache 210 or the disk medium 220 to each construction for writing data into the disk apparatus 20.

Then, the host interface unit 110 and the rebuild control unit 130, which receive the instruction from the cache control unit 190, instruct the disk control unit 120 whether the data is written into the write cache 210 or the disk medium 220 of the disk apparatus 20.

Alternatively, the disk control unit 120, which receives the instruction from the cache control unit 190, writes the data into the write cache 210 or the disk medium 220 of the disk apparatus 20 in accordance with the instruction.

The other operations of the host interface unit 110, the disk control unit 120 and the rebuild control unit 130 are the same as those of the disk array control apparatus 10 except for the operations described above.

A further detailed description is as follows.

The cache control unit 190 instructs the host interface unit 110 to write into the disk medium 220. The host interface unit 110 received this instruction instructs the disk control unit 120 to write into the disk medium 220.

The cache control unit 190 instructs the rebuild control unit 130 to write into the write cache 210. The rebuild control unit 130 received this instruction instructs the disk control unit 120 to write into the write cache 210. Further, the cache control unit 190 may instruct the rebuild control unit 130 to write into the disk medium 220 when it confirms that there is no access from the host controller through monitoring the state of the host interface unit 110. As a result, the disk control unit 120 writes at least a part of recovery data, which is instructed to be written by the rebuild control unit 130, into the disk medium 220. However, in this case, the cache control unit 190 instructs the rebuild control unit 130 to write into the write cache 210 when it detects an access from the host controller.

Alternatively, the cache control unit 190 may instruct the disk control unit 120 to write the write data from the host interface unit 110 into the disk medium 220, and the write data from the rebuild control unit 130 into the write cache 210. In this case, the disk control unit 120 writes the write data from the host interface unit 110 into the disk medium 220, and writes the write data based on an instruction from the rebuild control unit 130 into the write cache 210.

In such a way as described above, the disk array control apparatus 50 operates like the disk array control apparatus 10.

The disk array control apparatus 50 according to this modification example 2 brings out the similar advantageous effects as those in the case of the disk array control apparatus 10.

The reason for this is that the disk array control apparatus 50 can operate like the disk array control apparatus 10 shown in FIG. 1 on the basis of the instruction from the cache control unit 190.

Further, semiconductor memory module using for cache loses data when power supply stops.

Accordingly, the disk array apparatus described in the patent document 1 loses data which is stored into the write cache and is not completed into the disk medium when an electric trouble such as a sudden power interruption occurs.

Even after lost, write data for rebuilding can be created again on the basis of data stored in disk apparatuses which have been operating in the reduced state.

But, the write data from the host controller is lost because the completion of writing of the write data is already notified to the host controller.

That is, the disk array apparatus described in the patent document 1 has a problem which can not secure the write data from the host controller using a write cache for preventing the degradation of performance during rebuild processing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A disk array control apparatus comprising:
a host interface unit which receives write data from a host controller;
a rebuild control unit which controls rebuild processing for creating recovery data and writing the created recovery data into a disk medium; and
a disk control unit which instructs a disk apparatus which includes the disk medium and a cache to write the write data which is received from the host interface unit into the disk medium included in the disk apparatus, and instructs the disk apparatus to write at least a part of the recovery data which is created based on the control of the rebuild control unit into the write cache included in the disk apparatus.

2. The disk array control apparatus according to claim 1, wherein the disk control unit, based on an instruction of the host interface unit, writes the write data into the disk medium, and based on an instruction of the rebuild control unit, writes the recovery data into the write cache.

3. The disk array control apparatus according to claim 1, wherein
the disk control unit, based on a write command from the host interface unit, writes data into the disk medium, and based on a write instruction from the rebuild control unit, writes data into the cache.

4. The disk array control apparatus according to claim 1, further comprising:
a cache control unit which controls whether data is written into the disk medium or the write cache, wherein the disk control unit, based on a control of the cache control unit, writes into the disk medium or the cache.

5. The disk array control apparatus according to claim 1, wherein,
said disk control unit writes the at least part of the recovery data into the disk medium in the case where there is no access from the host controller.

6. A disk array apparatus comprising:
a plurality of disk apparatuses comprising,
a disk media which stores data, and
a write cache which temporarily stores the data which is stored into the disk media; and
a disk control apparatus comprising,
a host interface unit which receives the write data from a host controller,
a rebuild control unit which controls rebuild processing for creating recovery data and writing the created recovery data into the disk media, and
a disk control unit which instructs a disk apparatus which includes the disk medium and a cache to write the write data which is received from the host interface unit into the disk medium included in the disk apparatus, and instructs the disk apparatus to write at least a part of the recovery data which is created based on the control of the rebuild control unit into the write cache included in the disk apparatus.

7. A disk array control method comprising:
receiving write data from a host controller;
writing, using a disk apparatus comprising a disk medium and a write cache, the write data from the host interface unit into the disk medium;
creating recovery data; and
writing, using the disk apparatus, at least a part of the created recovery data into the write cache.

8. A computer readable medium embodying a program, said program causing a disk array control apparatus to perform a method, said method comprising:
receiving write data from a host controller;
writing, using a disk apparatus comprising a disk medium and a write cache, the write data from the host controller into the disk medium;
creating recovery data; and
writing, using the disk apparatus, at least a part of the created recovery data into the write cache.

9. A disk array control apparatus comprising:
a host interface means for receiving the write data from a host controller;
a rebuild control means for controlling rebuild processing for creating recovery data and writing the created recovery data into a disk medium; and
a disk control unit which instructs a disk apparatus which includes the disk medium and a cache to write the write data which is received from the host interface unit into the disk medium included in the disk apparatus, and instructs the disk apparatus to write at least a part of the recovery data which is created based on the control of the rebuild control unit into the write cache included in the disk apparatus.

* * * * *